United States Patent
Choi

(10) Patent No.: US 6,934,230 B2
(45) Date of Patent: Aug. 23, 2005

(54) VARIABLE DATA RECORDING/ REPRODUCING CONTROL APPARATUS AND METHOD OF AN OPTICAL RECORDING SYSTEM

(75) Inventor: Young Do Choi, Anyang (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 10/388,503

(22) Filed: Mar. 17, 2003

(65) Prior Publication Data

US 2003/0174609 A1 Sep. 18, 2003

Related U.S. Application Data

(62) Division of application No. 09/428,500, filed on Oct. 28, 1999, now Pat. No. 6,570,831.

(30) Foreign Application Priority Data

Oct. 28, 1998 (KR) ............................................. 98-46528

(51) Int. Cl.[7] .............................................. G11B 5/09
(52) U.S. Cl. .................................. 369/47.33; 369/53.34
(58) Field of Search ........................... 369/47.28, 47.32, 369/47.33, 47.34, 53.12, 53.31, 53.34, 53.42, 53.44, 59.25, 124.14

(56) References Cited

U.S. PATENT DOCUMENTS

| 5,289,440 A | * | 2/1994 | Bakx ........................ 369/30.23 |
| 5,432,769 A | * | 7/1995 | Honjo .......................... 386/46 |
| 5,463,607 A | | 10/1995 | Roth et al. |
| 5,471,450 A | * | 11/1995 | Yonemitsu et al. ...... 369/47.49 |
| 5,606,539 A | | 2/1997 | De Haan et al. |
| 5,712,742 A | | 1/1998 | Yamagata et al. |
| 5,815,472 A | | 9/1998 | Kuroda et al. |

* cited by examiner

Primary Examiner—Paul W. Huber
(74) Attorney, Agent, or Firm—Birch, Stewart, Kolasch & Birch, LLP

(57) ABSTRACT

A data recording speed control apparatus and method for recording a data on an optical recording medium are disclosed. The data recording speed control apparatus for recording a data on an optical recording medium includes a storing unit for storing data inputted, a data conversion unit for converting the stored data into a certain recording format at a certain speed, a recording unit for recording the converted data onto the optical recording medium, and a control unit for variably setting the conversion speed based on the amount of the data stored in the storing unit for thereby converting data inputted from a host into a recording format, recording format converted data on an optical recording medium at an initial speed, variably adjusting a recording format conversion speed of the data when a data input speed is changed, resetting the speed for recording the recording format changed data on an optical recording medium, and recording and reproducing the recording format changed data at a reset recording speed.

11 Claims, 6 Drawing Sheets

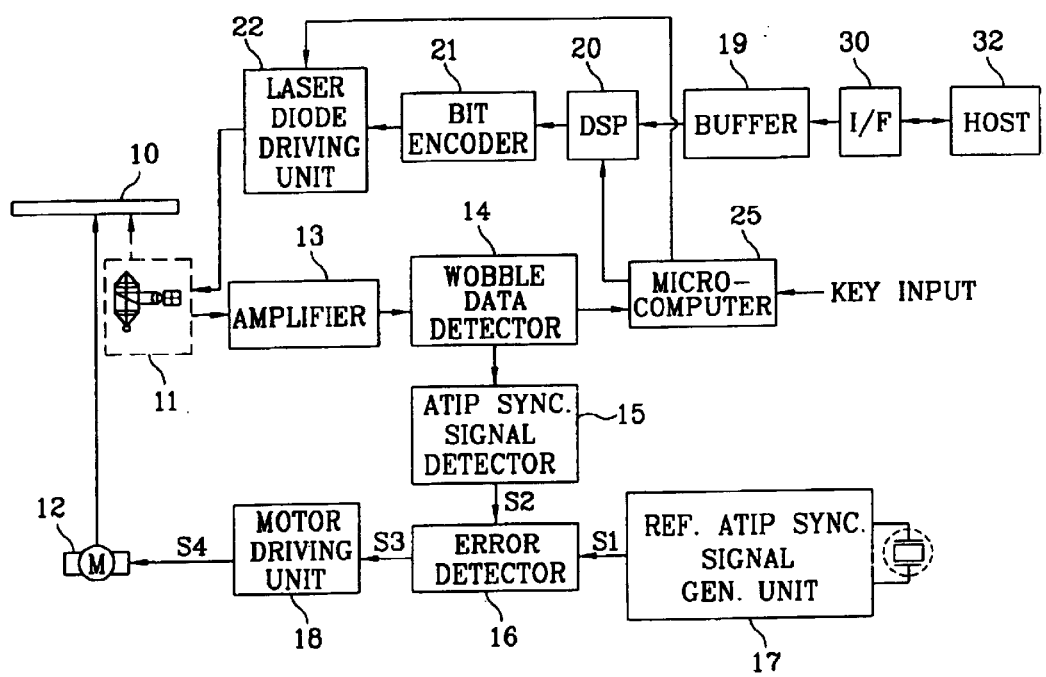

| SYNC. PATTERN | SUB-CODE DATA | DATA+ MARGIN BIT | PARITY DATA | DATA+ MARGIN BIT | PARITY DATA |
|---|---|---|---|---|---|
| 27BIT | 17BIT | 204BIT | 27BIT | 204BIT | 27BIT |

VARIABLE DATA RECORDING/REPRODUCING CONTROL APPARATUS AND METHOD OF AN OPTICAL RECORDING SYSTEM

This application is a divisional of application Ser. No. 09/428,500, filed on Oct. 28, 1999 now U.S. Pat. No. 6,570,831, the entire contents of which are hereby incorporated by reference and for which priority is claimed under 35 U.S.C. § 120; and this application claims priority of Application Ser. No. 46528/1998 filed in Korea on Oct. 28, 1998 under 35 U.S.C. § 119.

BACKGROUND OF THE INVENTION

1. Field of the Invention

The present invention relates to an optical recording medium recording/reproducing apparatus, and in particular to a data recording speed control apparatus and method for recording data on an optical recording medium. The present invention is capable of converting data inputted from a host into a recording format, recording the reformatted data on an optical medium at an initial speed, variably adjusting a recording format conversion speed of the data when a data input speed is changed, resetting the speed for recording the reformatted data on an optical recording medium, and recording and reproducing the reformatted data at the reset recording speed.

2. Description of the Background Art

FIG. 1 is a view illustrating a conventional optical recording medium recording/reproducing apparatus. As shown therein, the conventional optical recording medium recording/reproducing apparatus includes an interface unit 30 for receiving data from an external host 32 and transferring the same to a buffer 19, a digital recording signal processor 20 for converting data from the buffer 19 into a certain recording format by providing an error correction code to the data from the buffer 19, a bit encoder 21 for converting the recording format data into bit stream data, a laser diode driving unit 22 for driving a laser diode by providing a driving voltage corresponding to the bit stream data to the laser diode, an optical pick-up unit 11 for recording data onto an optical recording medium 10 and reading the recorded data, a motor driving unit 18 for driving a spindle motor 12, an amplifier 13 for amplifying a wobble signal of the optical recording medium 10 read from an auxiliary beam of the optical pick-up unit 11 at a certain level, a wobble data detector 14 for detecting wobble data corresponding to an amplified low frequency wobble signal, a ATIP synchronous signal detector 15 for detecting an ATIP synchronous signal from the detected wobble data, a reference ATIP synchronous signal generation unit 17 for generating a reference ATIP synchronous signal, an error detector 16 for detecting a phase difference between an ATIP synchronous signal from the ATIP synchronous signal detector 15 and a reference ATIP synchronous signal from the reference ATIP synchronous signal generation unit 17, a motor driving unit 18 for varying the data recording speed of an optical recording medium by applying a driving voltage corresponding to the detected phase difference to the spindle motor 12, and a microcomputer 25 for receiving wobble data from the wobble data detector 14, controlling variably the data conversion speed of the digital recording signal processor 20 and controlling operation of the laser diode driving unit 22.

The operation of the thusly constituted optical recording medium recording/reproducing apparatus will now be explained.

First, when a data record is requested from the host 32 (for example, PC) for recording onto an optical recording medium, the data outputted from the host 32 via the interface unit 30 is temporarily stored in the buffer 19. When buffer 19 stores the inputted data, the digital recording signal processor 20 sequentially reads out the data temporarily stored in the buffer 19 and outputs it to the bit encoded 21 at an initial speed.

The bit encoder 21 converts the processed signal data into a bit stream and outputs it to the laser diode driving unit 22, and the laser diode driving unit 22 outputs a driving voltage corresponding to the bit stream to a laser diode of the optical pick-up unit 11. Then, the laser diode scans the main laser beam across the recording surface of the optical recording medium in accordance with the driving voltage corresponding to the bit stream, thereby recording the inputted data.

While the inputted data is being recorded on the optical recording medium, an auxiliary beam formed on the recording surface of the optical recording medium detects a low frequency wobble signal from the optical recording medium together with the main beam, and the detected low frequency wobble signal is amplified to a certain level by the amplifier 13. A shown in FIG. 2, corresponding wobble data is detected by the wobble data detector 14.

As shown in FIG. 3A, when a reference ATIP synchronous signal is outputted from the reference ATIP synchronous signal generation unit 17, as shown in FIG. 3B, the ATIP synchronous detector 15 generates an ATIP synchronous signal whenever the ATIP synchronous detector 15 detects a ATIP synchronous signal. The error detector 16 compares a phase difference between the ATIP synchronous signal and the reference ATIP synchronous signal. As shown in FIG. 3C, error amounts e1 and e2 are detected.

The thusly detected error amounts e1 and e2 are applied to the motor driving unit 18, and as shown in FIG. 3D, the motor driving unit 18 applies a driving voltage corresponding to the error amount to the spindle motor 12, so that a recording speed of the recording/reproducing apparatus is controlled, and the recording speed based on the main beam is maintained. The ATIP synchronous signal is compared with the reference signal. As a result of the comparison, if the pulse width of the ATIP synchronous signal is larger than the pulse width of the reference signal, as shown in FIG. 3D, the motor driving unit 18 accelerates the spindle motor by the error amount e1, and on the contrary, the spindle motor is decelerated by the error amount e2. Therefore, the recording/reproducing apparatus of the optical recording medium uniformly maintains the recording speed of the data irrespective of the speed of the data inputted.

In the conventional recording/reproducing apparatus of the optical recording medium, when reproducing the data recorded on the optical recording medium, the reproducing speed variable operation is performed in the same manner as the recording speed variable operation.

However, when data is inputted from the host 32 and recorded data is reproduced at an initial speed for a certain period, the recording speed is varied based on the synchronous detection speed of the wobble data detected so that an initial recording speed is maintained and controlled.

At this time, when the data output speed from the host 32 is sharply increased or decreased, an error occurs in the recording operation of the optical recording medium recording/reproducing apparatus which operates at a uniform recording speed. In particular, in the case that the initial recording speed is high (e.g., 4×, 6×, 8×), when the host 32 performs an e-mail transmission or operates based on an internal interrupt operation, the data output speed of the host 32 is decreased. At this time, if there is no data inputted in the buffer 30, since a uniform recording speed of the optical recording medium recording/reproducing apparatus is maintained, the data may be incorrectly recorded, thereby causing a fatal error in the optical recording medium.

SUMMARY OF THE INVENTION

Accordingly, it is an object of the present invention to provide a data recording speed control apparatus for an optical recording medium recording/reproducing apparatus which is capable of variably adjusting recording speed for recording data onto an optical recording medium in accordance with the input speed of data by determining the data input speed.

It is another object of the present invention to provide a data recording speed control method of an optical recording medium recording/reproducing apparatus which is capable of variably adjusting the recording speed for recording data onto an optical recording medium in accordance with an input speed of data by determining the data input speed.

To achieve the above objects, there is provided a data recording speed control apparatus of an optical recording medium recording/reproducing apparatus which includes a storing unit for storing inputted data, a data conversion unit for converting the stored data into a certain recording format at a certain speed, a recording unit for recording the converted data onto an optical recording medium, and a control unit for variably setting the conversion speed based on the amount of data stored in the storing unit.

To achieve the above objects, there is provided a data recording speed control method of an optical recording medium recording/reproducing apparatus which includes a storing step for storing inputted data, a converting step for converting the inputted data into a certain recording format data, a computing step for computing the speed of the data conversion in the second step and a controlling step for controlling the recording speed of the optical recording medium based on a difference between the computed conversion speed of the third step and a previously set reference speed.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a view illustrating a data recording speed control apparatus for a conventional optical recording medium recording/reproducing system;

FIG. 2 is a view illustrating a format in the conventional art of wobble data generated based on a RF signal which is reproduced;

DETAILED DESCRIPTION OF THE PREFERRED EMBODIMENTS

Figure 3A:
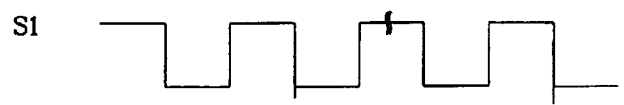
FIGS. 3A through 3D are wave form diagrams illustrating a signal inputted and outputted into and from each block of a data recording speed control apparatus for a conventional optical recording medium recording/reproducing system.
Figure 3B:
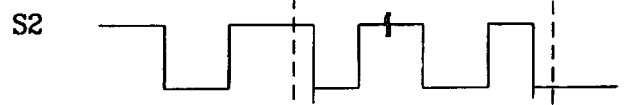
Figure 3C:
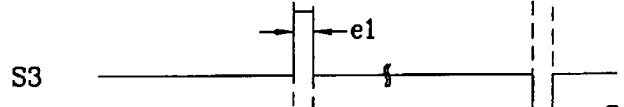
Figure 3D:
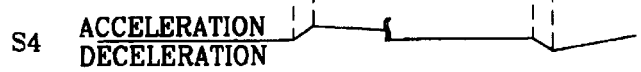
Figure 4:
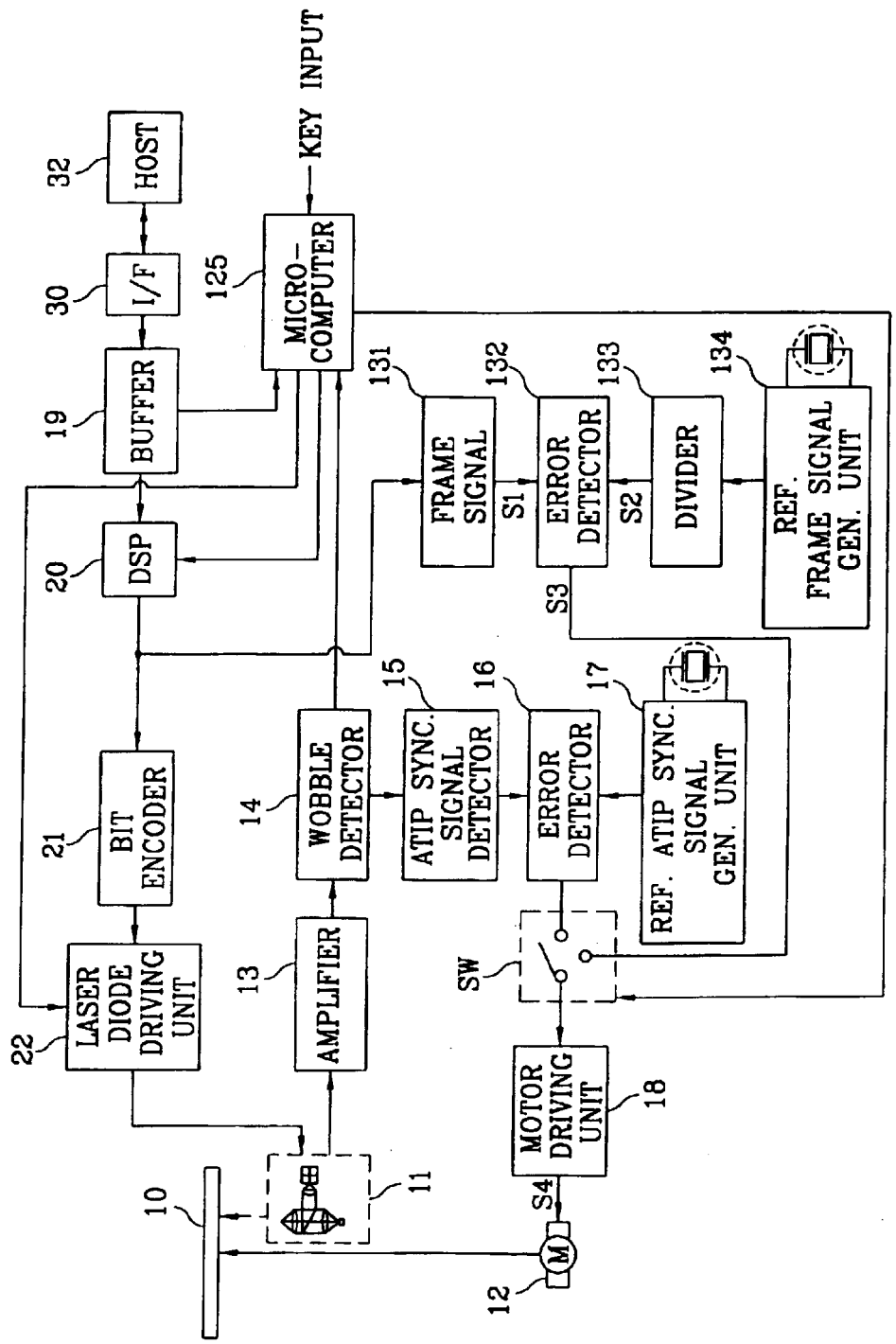
FIG. 4 is a view illustrating the construction of a data recording speed control apparatus of an optical recording medium recording/reproducing system according to the present invention.

FIG. 4 is a view illustrating the construction of a data recording speed control apparatus of an optical recording/reproducing system according to the present invention which includes the conventional circuit blocks of FIG. 1 and further includes a reference frame signal generator 134 for generating reference frame data based on an initial reference speed, a divider 133 for dividing the reference frame data and outputting a reference pulse signal, a frame signal detector 131 for generating a pulse signal whenever frame synchronous data is detected in the data outputted from the digital recording signal processor 20, an error detector 132 for comparing a phase difference between the pulse signal and the reference pulse signal for detecting an error amount, and a microcomputer 125 for switching the connection state of a switch in accordance with an external recording or reproducing request and variably adjusting the speed so that the digital recording signal processor 20 can variably adjust the variation speed of the data based on the data amount stored in the buffer 19 when requesting a recording operation.

Figure 5:
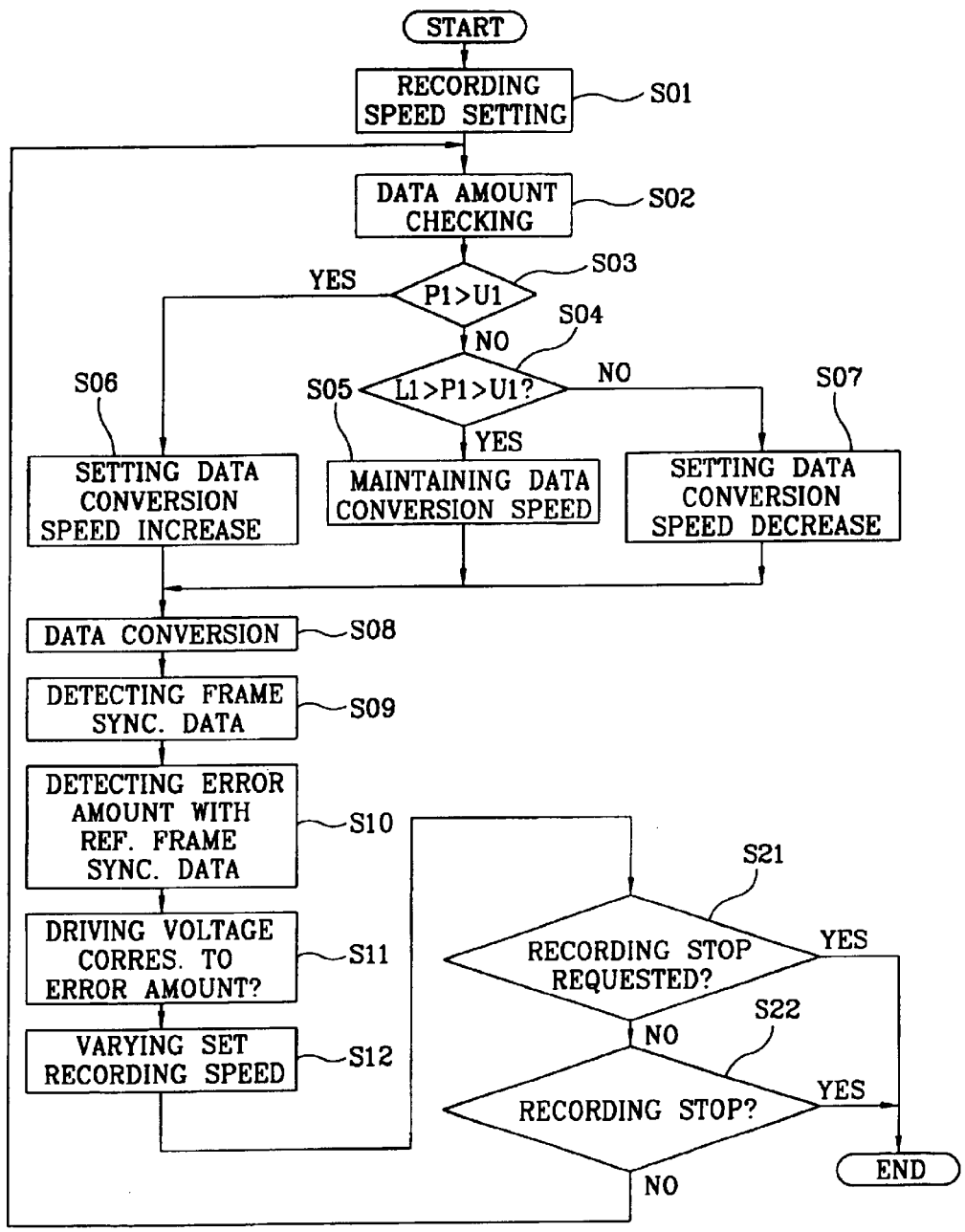
FIG. 5 is a flow chart illustrating a data recording speed control method for an optical recording medium recording/reproducing system according to the present invention.

The operation of the optical recording medium recording/reproducing system according to the present invention will now be explained with reference to the accompanying FIG. 5.

When a recording request is inputted, the initial recording speed is set in Step S01, the microcomputer 125 switches a switch to terminal b (when reproducing the data, the terminal of the switch is switched to terminal a), and the reference frame signal generator 134 generates reference frame data corresponding to the set speed.

When data to be recorded on the optical recording medium 10 is inputted from the host 32 via the interface unit 30, the data is sequentially inputted into the buffer 19. While the data is being stored into a buffer 19, a digital recording signal processing unit 20 reads out the data from the buffer 19 at an initial recording speed and converts the same into a recording format. The recording format converted data is recorded into a recording region of an optical recording medium 10 by an optical pick-up unit 11 via a bit encoder 21 and a laser diode driving unit 22.

While the data is being recorded onto the optical recording medium 10, the microcomputer 125 checks the data amount remaining (P1) in the buffer 19 in Step S02 and compares a previously set data amount with an upper limit U1 and a lower limit L1 in Step S03.

Figures 6, 7:
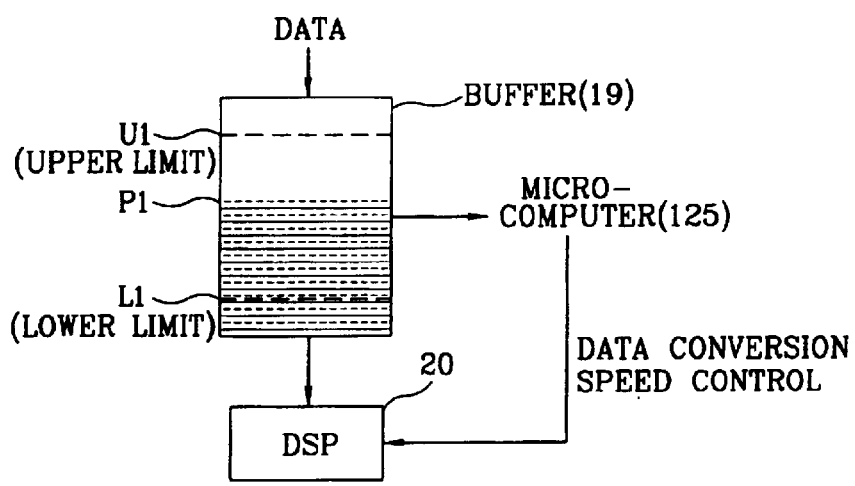
FIG. 6 is a view illustrating the construction of an interrelationship for variably controlling data conversion speed in accordance with a data amount which is temporarily stored in a buffer according to the present invention.
FIG. 7 is a view illustrating a data stream converted based on a recording format according to the present invention.

For example, as shown in FIG. 6, if the data amount P1 in the buffer 19 is in a range between the upper limit (U1 of FIG. 6) and the lower limit (L1 of FIG. 6), the microcomputer 125 maintains a data conversion speed at the digital recording signal processor 20 based on the set recording speed in Step S05.

If the data amount P1 is larger than the upper limit U1 or is smaller than the lower limit L1, the microcomputer 125 increases the data conversion speed by a certain level in Step S06 or decreases the data conversion speed by a certain level for thereby decreasing the data conversion speed in Step S07.

If the data conversion speed corresponding to an initial recording speed is 1× (7.35 MHz), and the data amount P1 is larger than the upper limit U1, the data conversion speed increases to 1.5 times which is 0.5 times higher compared to the initial speed.

If the data amount P1 is smaller than the lower limit L1, the data conversion speed decreases to 0.5 times which is lower compared to the initial speed.

Figures 8A, 8B, 8C, 8D:
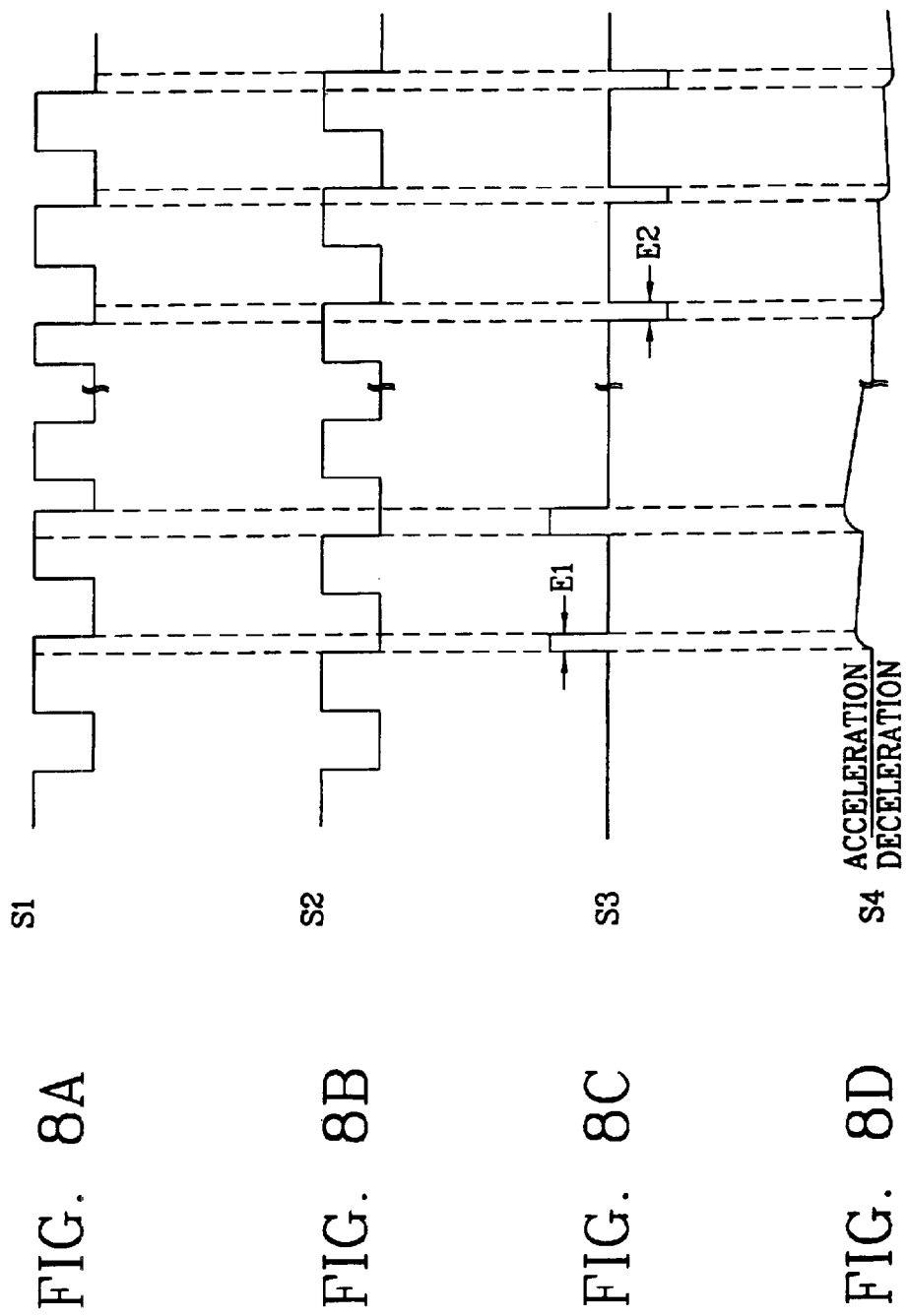
FIGS. 8A through 8D are wave form diagrams illustrating a signal inputted and outputted into and from each block of a data recording speed control apparatus of an optical recording medium recording/reproducing system according to the present invention.

The data which is format-converted at a set variable set in Step S08 and is outputted from the digital recording signal processor 20 is inputted into the frame synchronous signal detector 131, and as shown in FIG. 7, the frame synchronous signal detector 131 outputs a pulse signal in Step S09 as shown in FIG. 8A whenever a frame synchronous data at a leading portion in a 588-bit data stream (namely, one frame). As described above, when the data conversion speed is changed, the data conversion speed is varied at a period of a pulse signal outputted from the frame synchronous signal detector 131.

In addition, as shown in FIG. 8B, the reference frame synchronous data outputted from the reference frame signal generator 134 is converted into a reference pulse signal of a certain period through the divider 133 based on an initial recording speed. The error detector 132 compares a phase difference between the reference pulse signal (FIG. 8B) and the variable pulse signal (FIG. 8A) having a period which is variably outputted for thereby detecting an error amount (E1 and E2 of FIG. 8C) in Step S10, and the resulting amount of error detected is applied to the motor driving unit 18 via a route which is set by the microcomputer, and the motor driving unit 18 increases or decreases the driving voltage based on the received error in Step S11, and the initial recording speed is variably adjusted based on the varied format conversion speed of the current data, namely, the varied recording speed in Step S12. As shown in FIG. 8D, the pulse width of the reference signal and the pulse width of the pulse signal are compared. As a result of the comparison, if the pulse width of the variable pulse signal is larger (E1) than the pulse width of the reference pulse signal, the motor driving unit 18 applies the voltage corresponding to the amount of error detected E1 to the spindle motor 12 for thereby increasing the recording speed. If the pulse width of the variable pulse signal is smaller (E2) than the pulse width of the reference pulse signal, the motor driving unit 18 applies a voltage corresponding to the amount of error detected E2 to the spindle motor 12 for thereby decreasing the recording speed. The above-described routine (S02 through S12) is continued until the recording operation is stopped by a user's request in Step S21, or the recording operation of corresponding data is stopped in Step S22.

Therefore, in the speed varying recording apparatus for an optical recording medium recording/reproducing apparatus and a method thereof according to the present invention, while the data inputted from an external host 32 is being recorded into the optical recording medium at an initial speed, when the data input speed is varied based on the host 32 or an external environment, the initial recording speed is changed to a varied speed for thereby preventing a recording and reproducing error and implementing a stable recording operation.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A data recording speed control apparatus of an optical recording medium recording/reproducing system, comprising:
    a storing means for storing an inputted data;
    a data conversion means for converting the stored data into a predeterminded recording format;
    a recording means for recording the converted data onto an optical recording medium; and
    a control means for variably controlling a conversion speed based on the amount of the data stored in the storing means.

2. The apparatus of claim 1, wherein said control means increases the conversion speed by a certain level when the amount of data stored in the storing means exceeds a set upper limit and decreases the conversion speed when the amount of data stored is below a lower limit.

3. The apparatus of claim 1, wherein said control means varies a recording speed of the recording means based on the variably set data conversion speed.

4. The apparatus of claim 1, wherein said control means comprises:
    a reference frame signal generator to generate a reference frame data based on an initial reference speed;
    a divider to divide the reference frame data and outputting a reference pulse signal;
    a frame signal detector to generate a pulse signal whenever a frame synchronous data is detected among the data outputted from the data conversion means; and
    an error detector for comparing a phase difference between a pulse signal and a reference pulse signal.

5. The apparatus of claim 1, wherein said control means further comprises a swithing means for seleting one of the recording and reproducing modes of the optical recording medium recording/reproducing system.

6. A data recording speed control apparatus of an optical recording medium recording/reproducing system, comprising:
    a buffer to store inputted data;
    a formatter to convert the stored data into a predeterminded recording format data;
    a pick-up to record the predetermined recording format data onto an optical recording medium; and
    a microcomputer to check a buffering status of the buffer and control the conversion speed and the recording speed based on the amount of the data stored in the buffer.

7. The apparatus of claim 6, wherein said microcomputer increases the conversion speed by a certain level when the amount of data stored in the buffer exceeds a set upper limit and decreases the conversion speed when the amount of data stored is below a lower limit.

8. The apparatus of claim 6, wherein said microcomputer varies a recording speed of the pick-up based on the variably set data conversion speed.

9. The apparatus of claim 6, wherein said microcomputer comprises:
- a reference frame signal generator to generate reference frame data based on an initial reference speed;
- a divider to divide the reference frame data and output a reference pulse signal;
- a frame signal detector to generate a pulse signal whenever frame synchronous data is detected among the data outputted from the formatter; and
- an error detector for comparing a phase difference between a pulse signal and a reference pulse signal.

10. The apparatus of claim 6, wherein said microcomputer further comprises a switch to select one of the recording and reproducing modes of the optical recording medium recording/reproducing system.

11. The apparatus of claim 6, wherein said formatter comprises:
- a digital signal processor for converting the stored data into a bit stream; and
- a bit encoder to encode the bit stream to a predeteremined recording format data.

* * * * *